United States Patent [19]
Childs

[11] Patent Number: 5,623,648
[45] Date of Patent: Apr. 22, 1997

[54] CONTROLLER FOR INITIATING INSERTION OF WAIT STATES ON A SIGNAL BUS

[75] Inventor: Matthew H. Childs, Arlington, Tex.

[73] Assignee: National Semiconductor Corporation, Santa Clara, Calif.

[21] Appl. No.: 521,212

[22] Filed: Aug. 30, 1995

[51] Int. Cl.$^6$ .......................................... G06F 1/04
[52] U.S. Cl. ........................................ 395/557; 395/878
[58] Field of Search ................................... 395/557, 560, 395/878

[56] References Cited

U.S. PATENT DOCUMENTS

| | | | |
|---|---|---|---|
| 5,201,036 | 4/1993 | Yoshimatsu | 395/325 |
| 5,396,599 | 3/1995 | Cobbs et al. | 395/325 |
| 5,581,745 | 12/1996 | Muraoka et al. | 395/557 |

*Primary Examiner*—Thomas Heckler
*Attorney, Agent, or Firm*—Limbach & Limbach L.L.P.

[57] ABSTRACT

A controller for initiating an insertion of one or more wait states on a signal bus includes registers, AND logic circuits, a counter and a OR logic circuit. One register is for connecting to a signal bus and receiving therefrom a clock signal and in response thereto receiving and latching an address strobe signal to provide a latched address strobe signal. One AND logic circuit is for receiving the latched address strobe signal, connecting to the signal bus and receiving therefrom an address write signal and a chip select signal and logically ANDing the latched address strobe signal, the address write signal and the chip select signal to provide a first ANDed signal. Another register is for receiving a second clock signal and in response thereto receiving and latching the first ANDed signal to provide a first latched ANDed signal. Another AND logic circuit is for receiving and logically ANDing the first latched ANDed signal and a decoded address signal to provide a second ANDed signal. The counter is for receiving the second ANDed signal and the second lock signal and in response thereto providing a multiple-bit count signal. The OR logic circuit is for receiving and logically ORing the first latched ANDed signal and the multiple-bit count signal to provide a wait state control signal for initiating an insertion of one or more wait states on the signal bus.

14 Claims, 3 Drawing Sheets

5,623,648

CONTROLLER FOR INITIATING INSERTION OF WAIT STATES ON A SIGNAL BUS

BACKGROUND OF THE INVENTION

1. Field of the Invention

The present invention relates to signal bus interface circuits, and in particular, to signal bus interface circuits used for controlling access to signal buses including the initiation of wait states on such signal buses for selectively delaying such access.

2. Description of the Related Art

Complex digital logic systems typically use one or more signal buses for routing shared information such addresses and data. Connected to such signal buses are multiple blocks of logic circuits which, typically in a time shared manner, access such information via the signal buses. However, a problem which is becoming increasingly common as more sophisticated power management techniques are used is that of preventing movement of data into or out of logic blocks during transitions between power states, so as to prevent corruption of such data and/or risks of unauthorized access to sensitive data.

By way of example, a common power management technique involves the enabling and disabling of the clock signals to a block of logic for the purpose of minimizing its power consumption. Problems can arise, however, if such logic block is being accessed while its clock signal is in the process of being turned on or off. Such a problem can include corruption of data or, in the case of logic blocks involved in the storage or processing of sensitive data, a breach of security of such data. In other words, a security breach can occur if a logic block is being accessed while its clock is in the process of being turned off. This security breach can occur due to the unpredictability of results when access is being attempted during the disabling of the clock signal. Such a security breach can include the disclosure of sensitive data or placing the logic block in an unknown state.

Prior solutions to such problems have relied on software to not allow access by the system to those logic blocks that are being enabled or disabled. However, a shortcoming to this approach is that "no operation" (NOP) instructions must be inserted at the assembly language level to accomplish this. This adds to the code length, as well as to the time to develop the code, since pans of such code must be written at a low level. Additionally, in portable devices where memory space for code storage is limited, this extra code can add significantly to the expense of such devices.

Accordingly, it would be desirable to have a technique for preventing access to a logic block during such times its clock signal is being enabled or disabled, without needlessly adding to the length or complexity of the underlying software.

SUMMARY OF THE INVENTION

A controller for initiating an insertion of one or more wait states on a signal bus in accordance with the present invention removes the burden otherwise carried by software of initiating an insertion of one or more wait states on a signal bus to ensure that no data transactions are effected during the enabling or disabling of the data clock signals. This allows access to sensitive logic circuits to be controlled without requiring the storage or development of additional software. This advantageously allows for the minimization of integrated circuit (IC) die size by minimizing the amount of code needed, as well as for the minimization of firmware development by eliminating the need for writing additional low level code.

A controller for initiating an insertion of one or more wait states on a signal bus in accordance with one embodiment of the present invention includes: a first circuit for connecting to a signal bus and receiving therefrom a plurality of addressing signals corresponding to a plurality of logic circuits and providing in accordance therewith a first output signal which corresponds to an initiation of a wait state on the signal bus; and a second circuit, coupled to the first circuit, for receiving the first output signal and a second addressing signal corresponding to a selected logic circuit among the plurality of logic circuits and in accordance therewith providing a second output signal which corresponds to an initiation of one or more wait states on the signal bus.

One specific embodiment of a controller for initiating an insertion of one or more wait states on a signal bus in accordance with the present invention includes a number of registers and logic circuits and a counter. One register is for connecting to a signal bus and receiving therefrom a first clock signal and in response thereto receiving and latching an address strobe signal to provide a latched address strobe signal. One AND logic circuit, connected to the first register, is for receiving the latched address strobe signal, connecting to the signal bus and receiving therefrom an address write signal and a chip select signal and logically ANDing the latched address strobe signal, address write signal and chip select signal to provide a first ANDed signal. Another register, connected to the first AND logic circuit, is for receiving a second clock signal and in response thereto receiving and latching the first ANDed signal to provide a first latched ANDed signal. Another AND logic circuit, connected to the second register, is for receiving and logically ANDing the first iatched ANDed signal and a decoded address signal to provide a second ANDed signal. The counter, connected to the second AND logic circuit, is for receiving the second ANDed signal and second clock signal and in response thereto providing a multiple-bit count signal. An OR logic circuit, connected to the second register and counter, is for receiving and logically ORing the first latched ANDed signal and multiple-bit count signal to provide a wait state control signal for initiating an insertion of one or more wait states on the signal bus.

These and other features and advantages of the present invention will be understood upon consideration of the following detailed description of the invention and the accompanying drawings.

DETAILED DESCRIPTION OF THE INVENTION

Figure 1:
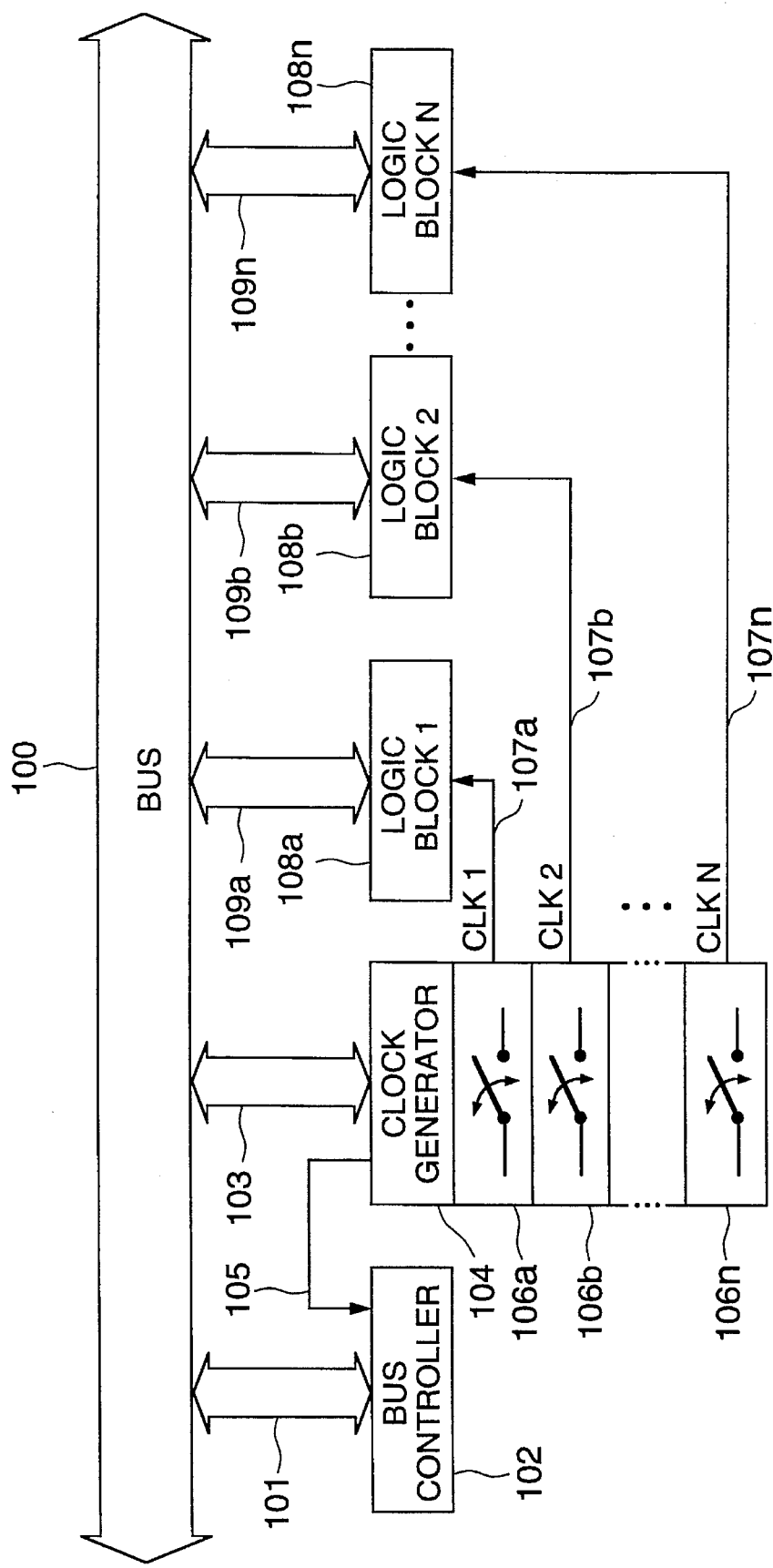
FIG. 1 is a functional block diagram of a system using a controller for initiating an insertion of one or more wait states on a signal bus in accordance with the present invention.

Referring to FIG. 1, an apparatus including a controller for initiating an insertion of one or more wait states on a signal bus includes a signal bus 100, a bus controller 102, a clock generator 104, a number of clock signal routing devices 106 (e.g. switches) and a number of logic blocks 1108a, 108b, . . . , 108n. The bus controller 102 communicates with and controls the signal bus 100 by way of a set 101 of interface and control signals. Similarly, the clock generator communicates with the signal bus 100 by way of a set 103 of interface signals. Additionally, the clock generator 104 provides a wait control signal 105 to the bus controller 102 for initiating an insertion of one or more wait states on the signal bus 100. The bus controller 102 performs such insertion of wait states in accordance with the wait control signal 105 via one of its interface and control signals 101.

Each of the logic blocks 108a, 108b, . . . , 108n also communicates with the signal bus 100 by way of a set 109 of interfaces signals. Additionally, each logic block 108a, 108b, . . . , 108n receives a clock signal 107a, 107b, . . . , 107n which is generated by the clock generator 104 and selectively enabled and disabled thereby via the use of the clock signal routing devices 106.

Figure 2:
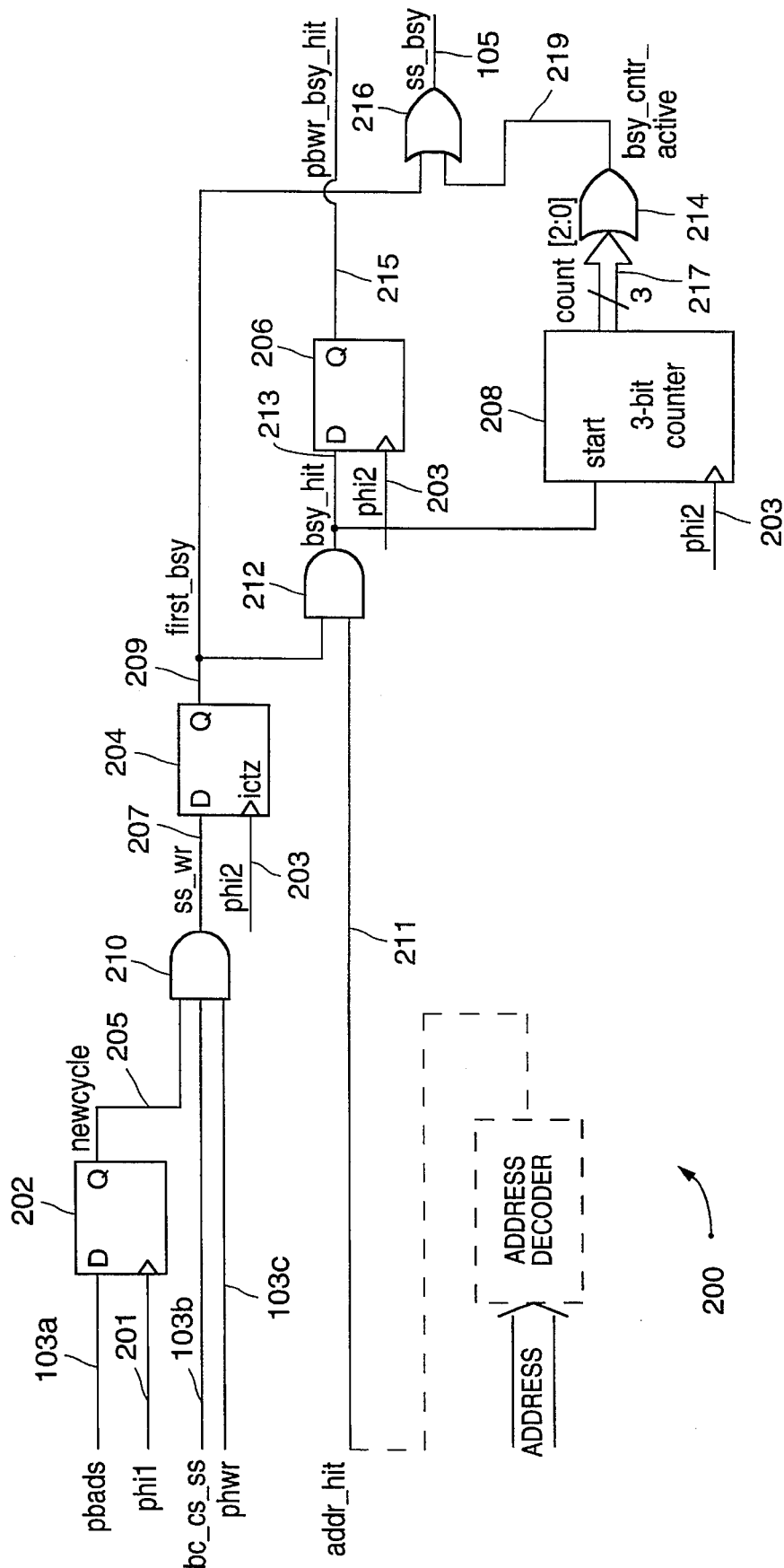
FIG. 2 is a schematic logic diagram of a controller for initiating an insertion of one or more wait states on a signal bus in accordance with one embodiment of the FIG. 3 is a timing diagram for the signals in the circuit of FIG. 2.

Referring to FIG. 2, a controller 200 for initiating an insertion of one or more wait states on the signal bus 100 in accordance with one embodiment of the present invention includes two registers (e.g. D-type flip-flops) 202, 204, two AND logic circuits 210, 212, a three-bit counter 208 and two OR logic circuits 214, 216, all interconnected substantially as shown. (As will be evident from the following discussion, the two OR gates 214, 216, can be replaced by a larger, multiple-input OR gate. Further, one additional register 206 is illustrated and noted in the following discussion; however, this register 206 is not necessary to the present invention.) This controller 200 is part of and contained in the clock generator 104 (FIG. 1).

The first register 202 receives and latches an address strobe signal 103a (received from the signal bus 100) in accordance With the primary phase 201 of the clock signal generated by the clock generator 104. The latched output signal 205 is logically ANDed in the first AND gate 210 with a chip select signal 103b and address write signal 103c (both also received from the isignal bus 100). The ANDed output signal 207 is latched by the second register 204 in accordance with the secondary phase 203 of the clock signal generated by the clock generator 104. The resulting latched output signal 209 corresponds to an initiation of a wait state on the signal bus 100 and can be used by the bus controller 102 (FIG. 1) when outputted as the wait control signal 105 via the output OR gate 216.

The second latched output signal 209 is also logically ANDed in the second AND gate 212 with a decoded address signal 211 (provided by an address decoder located elsewhere within the clock generator 104 which receives and decodes an address signal). The resulting ANDed output signal 213 is latched by another register 206 in accordance with the secondary clock signal phase 203 to provide a latched output signal 215 for use elsewhere within the clock generator 104. The second ANDed output signal 213 is also used as the start control signal for the counter 208 which then begins counting the pulses of the secondary clock signal phase 203, beginning at count 000. The resulting three-bit output count signhl 217 is logically ORed by the first OR gate 214. The resulting ORed output signal 219 is logically ORed with the aforementioned second latched output signal 209 in the dutput OR gate 216. The resulting final output ORed signal 105 forms the wait control signal 105 for initiating the insertion by the bus controller 102 of one or more wait states on the signal bus 100.

The second latched output signal 209 indicates access activity on the signal bus 100 and, accordingly, is used to initiate the insertion by the bus controller 102 of one wait state on the signal bus 100. Following that, the output count signal 217 from the counter 208, via the OR gates 214, 216, is used to initiate the insertion of additional, i.e. seven, wait states so as to ensure that the logic block to which the aforementioned addressing signals correspond cannot be accessed while its clock signals are being enabled or disable.

Figure 3:
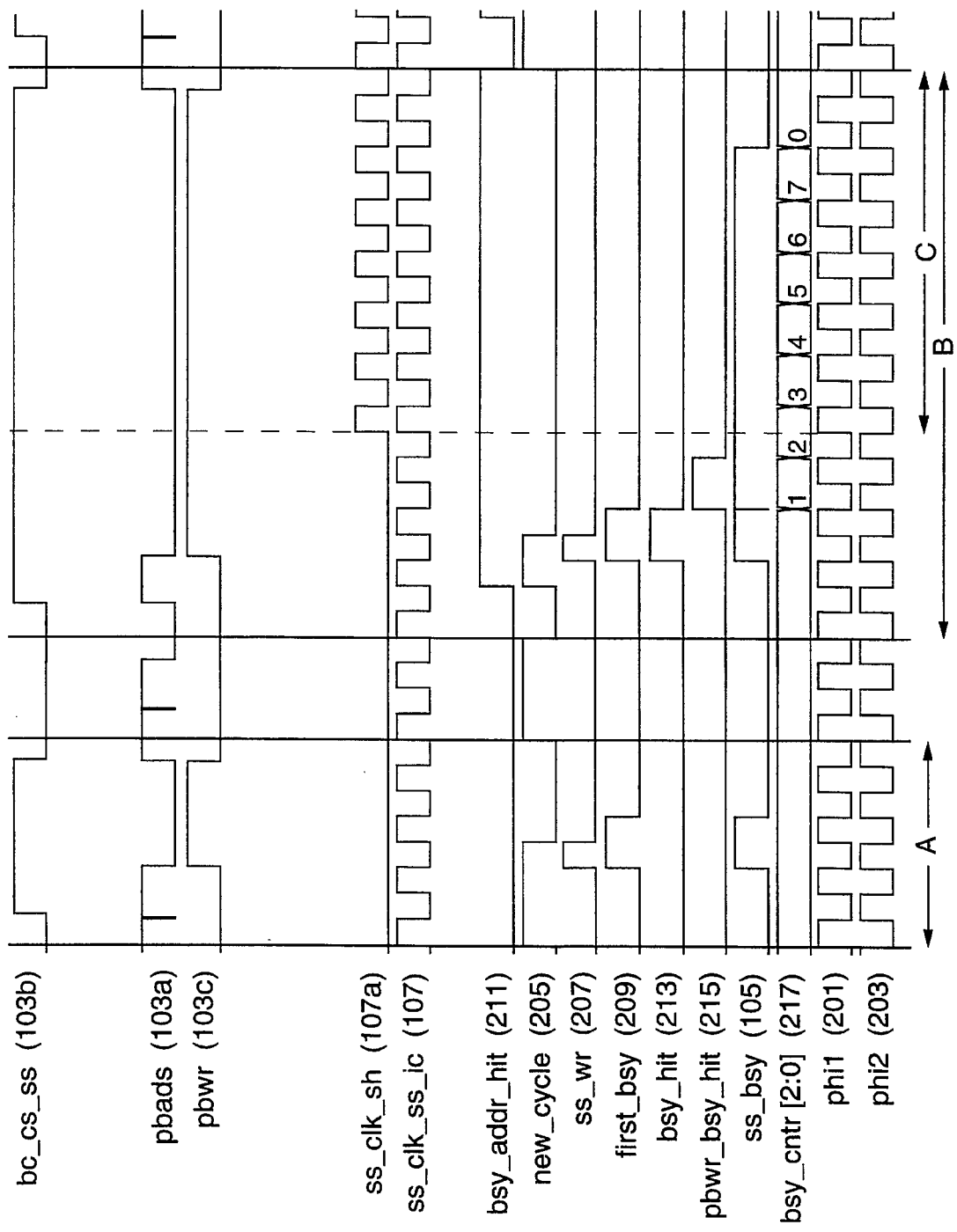

Referring to FIG. 3, the relative phase and timing relationships among the aforementioned signals in the circuit of FIG. 2 can be better understood. Initially each of the individual clocks 107a, 107b, . . . , 107n to the logic blocks 108a, 108b, . . . , 108n is disabled while the system, or master, clock 107 (as generated within the clock generator 104) is enabled. Bus cycle period A demonstrates a two wait-state write access to the clock generator 104. This is indicated by the chip select signal 103b and address write signal 103c being active. The address strobe signal 103a indicates the start of bus cycle period A. The first wait-state is inserted by the bus controller 102 by default. The second wait-state is inserted by the clock generator 104. This is indicated by the wait control signal 105 being active for one clock cycle. The clock generator 104 only inserts one wait-state since the/state of the clocks 107a, 107b, . . . , 107n is not being changed. The clock generator 104 determines this by decoding the bus address and indicates this by the decoded address signal 211 and second ANDed output signal 213 being de-asserted.

Bus cycle period B demonstrates afline wait-state write access to the clock generator 104. This difference between bus cycle periods A and B are as follow. First, the decoded address signal 211 and second ANDed output signal 213 are asserted. This indicates that the state of a clock or clocks 107a, 107b, . . . , 107n is changing and additional wait-states are to be inserted into current bus cycle period. The assertion of the second ANDed output signal 213 starts the counter 208 counting. Once the individual clock(s) 107a, 107b, . . . , 107n begins is enabled, seven more wait-states are inserted as indicated by bus cycle period C.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a controller for initiating an insertion of one or more wait states on a signal bus, said controller comprising:

a first circuit for connecting to a signal bus and receiving therefrom a plurality of addressing signals corresponding to a plurality of logic circuits and providing in accordance therewith a first output signal which corresponds to an initiation of a wait state on said signal bus; and a second circuit, coupled to said first circuit, for receiving said first output signal and a second addressing signal corresponding to a selected logic circuit among said plurality of logic circuits and in accordance therewith providing a second output signal which corresponds to an initiation of one or more wait states on said signal bus.

2. The apparatus of claim 1, wherein said first circuit comprises a plurality of registers and a logic gate serially coupled together.

3. The apparatus of claim 1, wherein said first output signal includes asserted and de-asserted states, said second output signal includes asserted and de-asserted states and said first output signal asserted state immediately precedes said second output signal asserted state.

4. The apparatus of claim 1, wherein said second circuit comprises:

and AND logic circuit for logically ANDing said first output signal and said second addressing signal to provide an ANDed signal;

a counter circuit, coupled to said AND logic circuit, for receiving said ANDed signal and a clock signal and in accordance therewith providing a plurality of counter output signals; and an OR logic circuit, coupled to said counter circuit and said first circuit, for logically ORing said first output signal and said plurality of counter output signals to provide said second output signal.

5. The apparatus of claim 1, further comprising a third circuit, coupled to said first and second circuits, for receiving said first and second output signals and in accordance therewith providing a third output signal which corresponds to an initiation of a plurality of wait states on said signal bus.

6. The apparatus of claim 5, wherein said third circuit comprises an OR logic circuit for logically ORing said first and isecond output signals to provide said third output signal.

7. An apparatus including a controller for initiating an insertion of one or more wait states on a signal bus, said controller comprising:

a first register for connecting io a signal bus and receiving therefrom a first clock signal and in response thereto receiving and latching an address strobe signal to provide a latched address strobe signal;

a first AND logic circuit, connected to said first register, for receiving said latched address strobe signal, for connecting to said signal bus and receiving therefrom an address write signal said a chip select signal and for logically ANDing said latched address strobe signal, said address write signal and said chip select signal to provide a first ANDed signal;

a second register, connected to said first AND logic circuit, for receiving a second clock signal and in response thereto receiving and latching said first ANDed signal to provide a first latched ANDed signal;

a second AND logic circuit, connected to said second register, for receiving and logically ANDing said first latched ANDed signal and a decoded address signal to provide a second ANDed signal;

a counter, connected to said second AND logic circuit, for receiving said second ANDed signal and said seconnd clock signal and in response thereto providing a multiple-bit count signal; and an OR logic circuit, connected to said second register and said counter, for receiving and logically ORing said first latched ANDed signal and said multiple-bit count signal to provide a wait state control signal for initiating an insertion of one or more wait states on said signal bus.

8. A method of initiating an insertion of one or more wait states on a signal bus, said method comprising the steps of:

connecting to a signal bus and receiving therefrom a plurality of addressing signals corresponding to a plurality iof logic circuits;

generating in accordance withi said plurality of addressing signals a first output signal which corresponds to an initiation of a wait state on said signal bus;

receiving a second addressing signal corresponding to a selected logic circuit among said plurality of logic circuits; and generating in accordance with said first output signal and said second addressing signal a second output signal which corresponds to an initiation of one or more wait states on said signal bus.

9. The method of claim 8, wherein said step of generating in accordance with said plurality of addressing signals a first output signal comprises sequentially latching and logically combining said plurality of addressing signals.

10. The method of claim 8, wherein said step of generating in accordance with said plurality of addressing signals a first output signal comprises generating a first output signal which includes asserted. and de-asserted states, and said step of generating in accordance with said first output signal and said second addressing signal a second output signal comprises generating a second output signal which includes asserted and de-asserted states, and wherein said first output signal asserted state immediately precedes said second output signal asserted state.

11. The method of claim 8, wherein said step of generating in accordance with said first output signal and said second addressing signal a second output signal comprises the steps of:

logically ANDing said first oreput signal and said second addressing signal to generate an ANDed signal;

receiving a clock signal;

generating a plurality of counter output signals in accordance with said ANDed signal and said clock signal; and logically ORing said first output signal and said plurality of counter output signals to generate said second output signal.

12. The method of claim 8, further comprising the step of generating in accordance with said first and second output signals a third output signal which corresponds to an initiation of a plurality of wait states on said signal bus.

13. The method of claim 12, wherein said step of generating in accordance with said first and second output signals a third output signal comprises logically ORing said first and second output signals to generate said third output signal.

14. A method of initiating an insertion of one or more wait states on a signal bus, said method comprising the steps of:

connecting to a signal bus;

receiving a first clock signal from said signal bus;

receiving and latching an address strobe signal in response to said first clock signal to generate a latched address strobe signal;

receiving an address write sigfial and a chip select signal from said signal bus;

logically ANDing said latched address strobe signal, said address write signal and said chip select signal to generate a first ANDed signal;

receiving a second clock signal;

latching said first ANDed signal in response to said second clock signal to generate a first latched ANDed signal;

receiving a decoded address signal;

logically ANDing said first latched ANDed signal and said decoded address signal to generate a second ANDed signal;

generating a multiple-bit count signal in response to said second ANDed signal and said second clock signal; and logically ORing said first latchedd ANDed signal and said multiple-bit count signal to generate a wait state control signal for initiating an insertion of one or more wait states on said signal bus.

* * * * *

UNITED STATES PATENT AND TRADEMARK OFFICE
CERTIFICATE OF CORRECTION

PATENT NO. : 5,623,648
DATED : April 22, 1997
INVENTOR(S) : MATTHEW H. CHILDS

It is certified that error appears in the above-indentified patent and that said Letters Patent is hereby corrected as shown below:

In Col. 5, line 13, before "AND logic" delete "and" and replace with --an--.

In Col. 5, line 32, delete "isecond" and replace with --second--.

In Col. 5, line 59, delete "seconnd" and replace with --second--.

In Col. 6, line 5, delete "iof" and replace with --of--.

In Col. 6, line 6, delete "withi" and replace with --with--.

In Col. 6, line 24, delete "asserted." and replace with --asserted--.

In Col. 6, line 36, delete "oreput" and replace with --output--.

In Col. 6, line 63, delete "sigfial" and replace with --signal--.

In Col. 8, line 3, delete "latchedd" and replace with --latched--.

Signed and Sealed this

Eighth Day of July, 1997

Attest:

BRUCE LEHMAN

Attesting Officer

Commissioner of Patents and Trademarks